G. E. RUCKSTELL.
TRANSMISSION BEARING AND UNIVERSAL JOINT CAP.
APPLICATION FILED JULY 19, 1920.
1,392,452.
Patented Oct. 4, 1921.
2 SHEETS—SHEET 1.
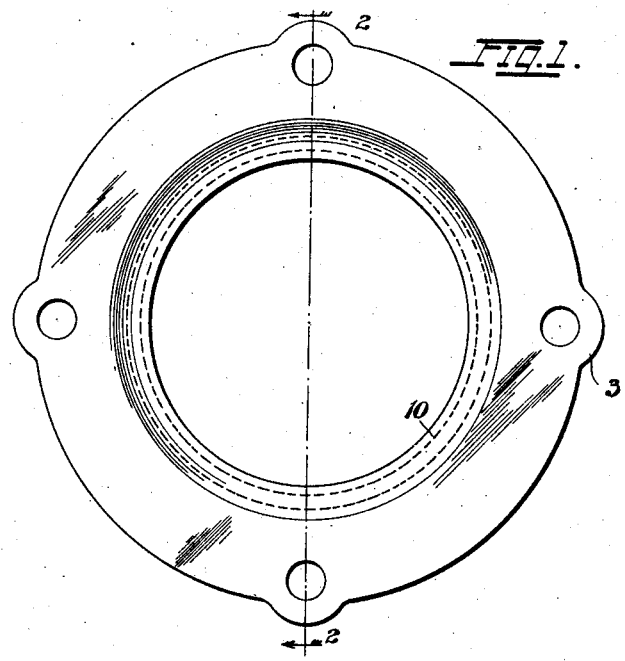
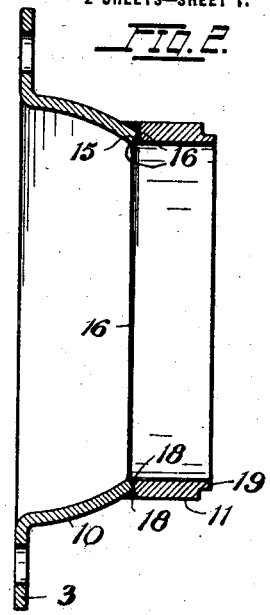
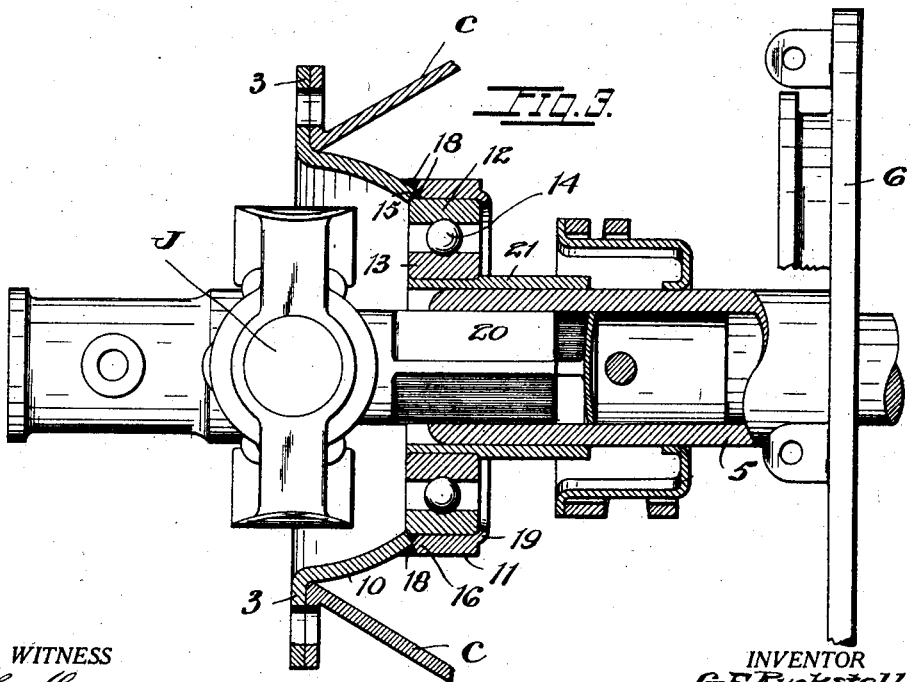
WITNESS
INVENTOR
G. E. Ruckstell.
BY
White Prost Evans.
his, ATTORNEYS G. E. RUCKSTELL.
TRANSMISSION BEARING AND UNIVERSAL JOINT CAP.
APPLICATION FILED JULY 19, 1920.

1,392,452.

Patented Oct. 4, 1921.
2 SHEETS—SHEET 2.

WITNESS

INVENTOR
G. E. Ruckstell.
BY
his ATTORNEYS ical purposes.

UNITED STATES PATENT OFFICE.

GLOVER EDWIN RUCKSTELL, OF SAN FRANCISCO, CALIFORNIA, ASSIGNOR TO HALL SCOTT MOTOR CAR COMPANY, INCORPORATED, OF SAN FRANCISCO, CALIFORNIA, A CORPORATION OF CALIFORNIA.

TRANSMISSION-BEARING AND UNIVERSAL-JOINT CAP.

1,392,452.   Specification of Letters Patent.   Patented Oct. 4, 1921.

Application filed July 19, 1920. Serial No. 397,320.

*To all whom it may concern:*

Be it known that I, GLOVER EDWIN RUCKSTELL, a citizen of the United States, and a resident of the city and county of San Francisco and State of California, have invented a new and useful Transmission-Bearing and Universal-Joint Cap, of which the following is a specification.

This invention relates to transmission mechanisms and particularly to an improved bearing and universal joint cap for motor vehicle transmission mechanisms.

In a certain popular type of motor vehicle known as the Ford, power is transmitted from the power plant of the vehicle through means of a transmission mechanism including a drive plate having a tubular central stem forming a socket to receive a male portion of a universal joint, beyond which joint the power is transmitted by a propeller shaft to the drive axle of the vehicle. In the present construction of this type of vehicle, the socket portion of the drive plate is journaled in a bearing device in the form of a concavo-convex plate having a flange that is secured to the contiguous end of the transmission case. The direct bearing or journaling of the drive plate socket is formed by a thin interior lining at the small end of the concavo-convex plate in the cavity of which the universal joint structure is covered. This thin lining bearing obviously is of comparatively short life and is renewed with difficulty by the dismantling of the transmitting mechanisms and the removal of the universal joint cap.

It is one of the objects of the present invention to improve this bearing structure so as to greatly increase the longevity and utility of the operating coördinate elements and particularly it is an object of the invention to eliminate the thin bearing lining or sleeve in the universal joint cap and to replace the same by an anti-friction or ball-bearing device with the obvious reduction of friction and increment in the life of the part.

It is a further object of the invention to provide either for the utilization of the usual Ford universal joint cap and bearing device by the slight alteration of the same or to enable the replacement of the usual ball-bearing cap by another that will be supported in the usual manner on the contiguous end of the transmission casing and that will provide for an improved bearing.

It is a further object of the present invention to utilize at least a portion of the usual Ford universal joint cap in the construction of a bearing structure and to secure to such portion means for holding a suitable form of anti-friction or ball-bearing joint, and, in this connection it is a further object of the invention to provide for the reconstruction of the usual Ford universal joint cap in a manner that is at once simple, practicable, inexpensive and that will not require any alteration of the casing structure.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description as variations may be adopted within the scope of the invention as set forth in the claims.

Referring to the drawings:

Figure 1 is an end elevation of the improved cap and bearing device.

Fig. 2 is a diametrical section of the same on line 2—2 of Fig. 1.

Fig. 3 is a longitudinal section and partial elevation showing an assembly of the improved bearing structure with the associated parts.

Figure 4:
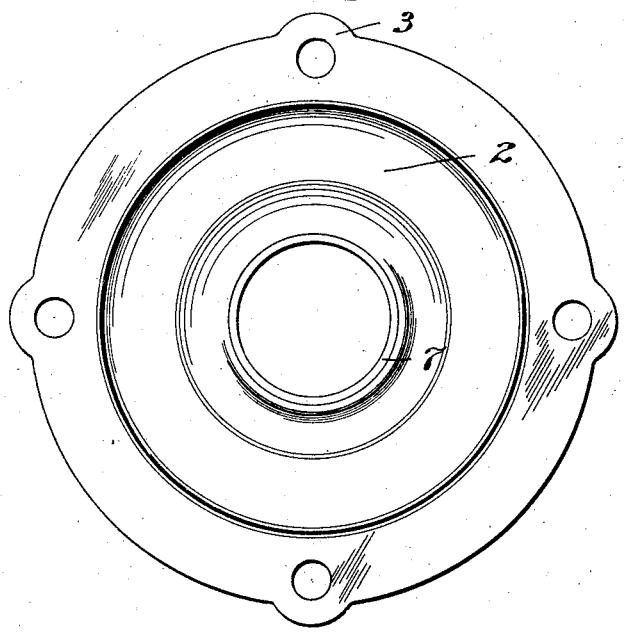
Fig. 4 is an end elevation.
Figure 5:
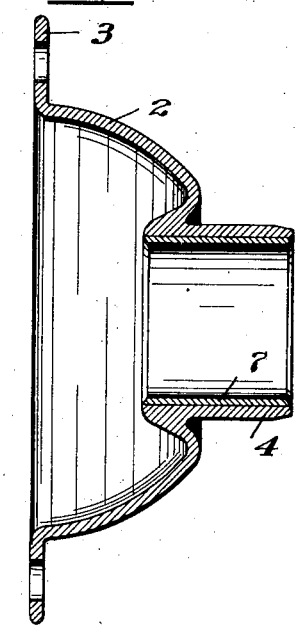
Fig. 5 is a diametrical section of the usual form of Ford universal joint cap and bearing sleeve.
Figure 6:
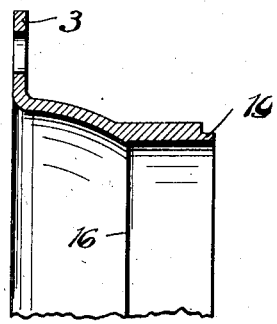
Fig. 6 shows an integral cap.

The present invention pertains to an improvement of that type of universal joint cap and bearing sleeve which is illustrated in Figs. 4 and 5 and which comprises a substantially concavo-convex or cup shaped member one end of which is provided with a circumferential flange applicable to the usual casing of the transmission mechanism of a Ford motor vehicle; the cavity of the cup shaped member forming a receptacle for the contiguous universal joint connecting the propeller shaft of the vehicle to a driving portion consisting of a drive plate having a central axially extending sleeve or socket forming portion to receive a complementary stem of the universal joint. The socket portion of the dive plate is journaled in a sleeve-like hub formed on the universal joint cap member and which sleeve is commonly provided with a thin interior bearing or bushing which is rapidly worn out and requires replacement with considerable difficulty in the dismantling of the organization. It is a purose of this invention to displace the usual Ford cap entirely or to utilize a portion of the same to provide an improved bearing. The usual cap comprises a concave-convex shell portion 2 having at its larger end an annular flat flange 3 designed to be secured to the adjacent flanged end of the usual transmission casing C, Fig. 3, in such position that the smaller sleeve-like end 4 of the shell 2 projects into the transmission casing to receive the contiguous cylindrical end of a socket part 5 forming a portion of a drive plate 6; this being an element of the usual transmitting mechanism of Ford motors. To take the wear of the running joint socket 5, the sleeve 4 is provided with a thin lining or bushing 7, which, obviously, is rapidly worn to an unserviceable condition.

A feature of the present invention resides in the reconstruction of the shell 2 or universal joint cap by removing the smaller end of the cup shaped portion together with the sleeve 4 thereof and by substituting for the removed portion of the shell a substantially cylindrical ring or band preferably abutted against the smaller end of the shell designated 10 in Fig. 2. The usual cup shaped shell 2 of the cap is severed in a transverse plane with relation to the axis of the cap at such a distance from the face flange 3 as will provide for the attachment of the cylindrical band 11 that has an internal diameter sufficient to receive a suitable type of anti-friction or ball-bearing comprising an outer race or ring 12 and an inner race 13 interposed between which is a set of balls 14. The cap shell 10 of Fig. 2 having its smaller end cut away to form a conical surface 15 converging inwardly and against the outer angle or corner of which surface there is abutted the sleeve or band 11 which may be attached to the shell 10 in any suitable manner preferably by welding the abutting edge surfaces of the shell 10 and the band 11 together. The inner diameter of the band 11 is shown as somewhat larger than the inner diameter of the conical edge 15 of the shell 10 so that there is an inwardly projecting corner or shoulder 16 which may be utilized to provide a stop or abutment against which the inwardly forced outer race or ing 12 of the ball-bearing may be jammed. The abutted edge of the band 11 is shown as provided with oppositely beveled faces forming internal and external annular channels that may be filled with a suitable welding material indicated at 18. The outer end edge of the band 11 is preferably provided with a slight outwardly projecting annular bead or flange-like portion 19 that is adapted to be spun or pressed inwardly to overlap the adjacent corner of the race ring 12, so that the latter is securely retained in its proper position in the inner surface of the band without the use of extraneous fastening means.

It will be understood that when the usual cap 2 of Fig. 5 is reconstructed to provide for the mounting of an internal ball-bearing, the sleeve or band portion 11 may be secured thereto in any suitable manner. Again it is understood that it is within the purview of the present invention to entirely remove the usual cap 2 and substitute for the same an entirely new cap that may have the shell part 10 and the band 11 all of integral construction. However it will be seen that by the present invention with a sufficiently large number of the usual caps 2 to be reconstructed this operation can be performed at a comparatively small expense and the usual cap converted into a bearing member having an anti-friction bearing for the reception of the driving element from the transmission mechanism.

The improved cap is shown in Fig. 3 as secured to the usual transmission casing C so that the ball-bearing extends into the casing while the shell-like portion 10 covers the contiguous universal joint J which need not be specifically described other than to state that it has an extending male portion or stem 20 of non-circular cross section to be held in non-rotative position in the socket 5 formed in the stem of the drive plate 6. This drive plate is shown as provided with an exterior sleeve 21 on which is securely mounted the inner race ring 13 of the ball bearing.

What is claimed is:

1. The universal joint cap and bearing support of a motor vehicle, said cap having its usual smaller end removed and a sleeve applied in its stead, and a ball-bearing retained in the sleeve to take the contiguous end of a drive element of the transmission; the cap having at its larger end means to secure it to the usual casing.

2. The universal joint cap and bearing support of a motor vehicle, said cap having its usual smaller end removed and a sleeve applied in its stead, and a ball-bearing supported in and by the sleeve to take the contiguous end of a drive element of the transmission, said sleeve welded to the cap.

3. The universal joint cap and casing end of a motor vehicle, said cap having its usual smaller end removed and a sleeve applied in its stead, and a ball-bearing retained in the sleeve to take the contiguous end of a drive element of the transmission, said sleeve butt-welded to the cap.

4. The universal joint cap and casing end of a motor vehicle, said cap having its usual smaller end removed and a sleeve applied in its stead, and a ball bearing retained in the sleeve to take the contiguous end of a drive element of the transmission, said sleeve and cap forming an internal shoulder against which one end of the ball bearing is abutted.

5. The universal joint cap and casing end of a motor vehicle, said cap having its usual smaller end removed and a sleeve applied in its stead, and a ball bearing retained in the sleeve to take the contiguous end of a drive element of the transmission, one end of the sleeve worked in over the contiguous end of the ball-bearing to secure it in place.

6. A universal joint cap and bearing part for a vehicle transmission casing, said cap having a sleeve at one end at the inner end of which is a shoulder; the outer end of the sleeve adapted to be pressed inwardly to retain an inserted ball-bearing race-ring.

In testimony whereof I have hereunto set my hand.

GLOVER EDWIN RUCKSTELL.